United States Patent [19]

Ikeguchi et al.

[11] 4,369,302

[45] Jan. 18, 1983

[54] CURABLE RESIN COMPOSITION COMPRISING CYANATE ESTER AND POLYISOCYANATE

[75] Inventors: Nobuyuki Ikeguchi; Yasunori Osaki, both of Tokyo, Japan

[73] Assignee: Mitsubishi Gas Chemical Company, Inc., Tokyo, Japan

[21] Appl. No.: 221,282

[22] Filed: Dec. 30, 1980

[30] Foreign Application Priority Data

Jan. 7, 1980 [JP] Japan .................................. 55-461

[51] Int. Cl.$^3$ ...................... C08G 18/00; C08G 18/04
[52] U.S. Cl. .................................. 528/73; 428/423.1; 428/473.5; 525/452; 525/461; 525/467; 528/44; 528/75; 528/86; 528/117; 528/119; 528/170; 528/172; 528/211; 528/248; 528/253; 528/322
[58] Field of Search ................... 528/44, 73, 322, 175, 528/86, 117, 119, 172, 170, 211, 248, 253; 525/452, 461, 467

[56] References Cited

U.S. PATENT DOCUMENTS

| | | | |
|---|---|---|---|
| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AR |
| 4,022,755 | 5/1977 | Tanigaichi et al. | 260/59 R |
| 4,026,913 | 5/1977 | Tanigaichi et al. | 260/463 |
| 4,110,364 | 8/1978 | Gaku et al. | 528/170 |

FOREIGN PATENT DOCUMENTS 1060933 5/1965 United Kingdom .

*Primary Examiner*—Harold D. Anderson
*Attorney, Agent, or Firm*—Fleit & Jacobson

[57] ABSTRACT

A curable resin composition comprising a mixture and/or a preliminary reaction product of (a) at least one cyanate compound selected from the group consisting of polyfunctional cyanate esters, prepolymers of said cyanate esters, coprepolymers of said cyanate esters and an amine and mixtures thereof, (b) at least one polyisocyanate compound selected from the group consisting of polyisocyanates, prepolymers of said polyisocyanates, coprepolymer of said polyisocyanates and an acid anhydride and mixtures thereof and (c) at least one maleimide compound selected from the group consisting of polyfunctional maleimides, prepolymer of said maleimides, coprepolymers of said maleimides and an amine and mixtures thereof is disclosed.

11 Claims, No Drawings

CURABLE RESIN COMPOSITION COMPRISING CYANATE ESTER AND POLYISOCYANATE

BACKGROUND OF THE INVENTION

This invention relates to a curable resin composition comprising a mixture and/or a preliminary reaction product of (a) a polyfunctional cyanate ester, a prepolymer of the cyanate ester or a coprepolymer of the cyanate ester and an amine (sometimes hereinunder referred to as component (a)), and (b) a polyisocyanate, a prepolymer of the polyisocyanate, or a coprepolymer of the polyisocyanate and an acid anhydride (sometimes hereinunder referred to as component (b)) and also relates to a curable resin composition comprising a mixture and/or a preliminary reaction product of component (a), component (b) and (c) a polyfunctional maleimide, a prepolymer of the maleimide or a coprepolymer of the maleimide and an amine (sometimes hereinunder referred to as component (c)). Cured resin obtained by curing each of the resin compositions has excellent mechanical property, heat-resistance and chemical resistance.

In the prior art, the cured resin obtained from a composition containing a polyisocyanate and an epoxy resin has low moisture resistance and storage stability.

SUMMARY OF THE INVENTION

The present inventors carried out research for obtaining a cured resin having excellent mechanical properties, such as heat-resistance and chemical resistance. As a result it was found that when a curable resin composition comprising a mixture and/or a preliminary reaction product of (a) a polyfunctional cyanate ester, a prepolymer of the cyanate ester or a coprepolymer of the cyanate ester and an amine, and (b) a polyisocyanate, a prepolymer of the polyisocyanate or a coprepolymer of the polyisocyanate and an acid anhydride, or a curable resin composition comprising a mixture and/or a preliminary reaction product of above component (a), above component (b) and (c) a polyfunctional maleimide, prepolymer of the maleimide or coprepolymer of the maleimide and an amine is cured, a cured resin having the above mentioned desirable properties can be obtained. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula

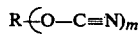

wherein R is an aromatic nucleus-containing residue which is selected from the group consisting of a residue derived from an aromatic hydrocarbon selected from the group consisting of benzene, diphenyl and naphthalene, a residue derived from a compound in which at least two benzene rings are bonded to each other by a bridging member selected from the group consisting of

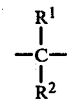

wherein $R^1$ and $R^2$ are the same or different and each represents a hydrogen atom or an alkyl group containing 1 to 4 carbon atoms,

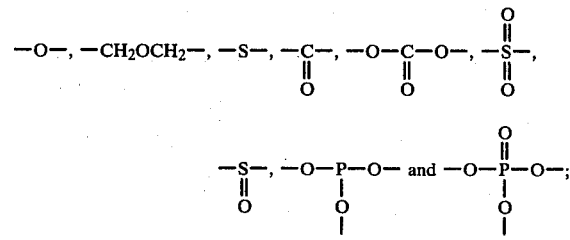

said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-trichyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibloro-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 4112/1979 and Japanese Patent Publication (laid open) No. 63149/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis (4-aminophenyl)ether, bis(4-aminophenyl)sulfone, bis(4-amino-3-methylphenyl)methane, bis(3-chloro-4-aminophenyl)methane, bis (4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl) phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

By polyisocyanate is meant a compound represented by the formula

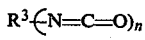

wherein $R^3$ is an organic group having valency of n and not having active hydrogen, and n is an integer of 2 or more.

Examples of the polyisocyanates include 2,2-bis(p-isocyanatophenyl)propane; bis(p-isocyanatophenyl)methane; 4,4'-diisocyanatobiphenyl; 4,4'-diisocyanatodiphenyl sulfone; 4,4'-diisocyanatodiphenyl ether; 1,1-di(p-isocyanatophenyl)cyclohexane; methyl-bis(m-isocyanatophenyl)phosphineoxide; 1,5-diisocyanatonaphthalene; m-phenylenediisocyanate; tolylenediisocyanate; 3,3'-dimethyl-4,4'-diisocyanatobiphenyl; 3,3'-dimethoxy-4,4'-diisocyanatobiphenyl; m-xylylenediisocyanate; p-xylylenediisocyanate; bis(4-isocyanatohexyl)methane; hexamethylenediisocyanate; dodecamethylenediisocyanate; 2,11-diisocyanato dodecane; bis(p-phenyleneisocyanate-oxadiazole-1,3,4)p-phenylene; bis(p-phenyleneisocyanate)oxadiazole-1,3,4; bis(m-phenyleneisocyanate)oxadiazole-1,3,4; bis(4-p-phenyleneisocyanate-thiazol-2-yl)m-phenylene; bis(m-phenyleneisocyanate)4-phenyltriazole-1,2,4; (2-phenylene)benzimidazole-5,4'-diisocyanate; (2-phenylene)-benzoxazole-5,4'-diisocyanate; (2-phenylene)benzothiazole-6,4'-diisocyanate; bis(2-phenyleneisocyanate-benzimidazol-6-yl)2,5-oxadiazole-1,3,4; bis(p-phenyleneisocyanate-2-benzimidazole-6-yl); bis(p-phenyleneisocyanate-2-benzoxazole-6-yl); tris(p-isocyanatophenyl)methane; namely 4,4',4''-triisocyanatotriphenyl methane; 2,4',4''-triisocyanatodiphenyl ether; 4,4',4''-triisocyanatotriphenyl phosphate; namely tri(p-isocyanatophenyl)phosphate; 2,4,6-triisocyanato-1-methylbenzene; 2,4,6-triisocyanato-1,3,5-trimethylbenzene; 1,3,7-triisocyanatonaphthalene; 2,4,4'-triisocyanatodiphenyl; 2,4,4'-triisocyanato-3-methyldiphenylmethane; 2,2',5,5'-tetraisocyanato-4,4'-dimethyldiphenylmethane; polyisocyanato polyphenylene polymethylene; polyisocyanato polyoxyphenylene and so on. It may be used alone or mixture thereof may be used.

A prepolymer of a polyisocyanate, such as trimer of a polyisocyanate obtained by preliminarily reacting the polyisocyanate in the presence of absence of a catalyst may be used as component (b).

A coprepolymer of a polyisocyanate and an acid anhydride may be used as component (b). Mixture of two or three of a polyisocyanate, prepolymer of a polyisocyanate and coprepolymer of a polyisocyanate and an acid anhydride may be used as component (b).

The acid anhydride is represented by the formula

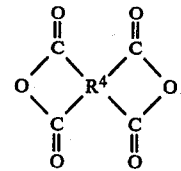

wherein $R^4$ is organic group having 2 or more carbon atoms and valency of 4 or more and having no active hydrogen, and $R^4$ has such a structure that the two lactone 1-oxide rings have 4 to 6 members.

Examples of the acid anhydrides include pyromellitic dianhydride, naphthalene-2,3,6,7-tetracarboxylic dianhydride, diphenyl-3,3',4,4'-tetracarboxylic dianhydride, naphthalene-1,4,5,8-tetracarboxylic dianhydride, naphthalene-1,2,5,6-tetracarboxylic dianhydride, bis(3,4-dicarboxyphenyl)sulfone dianhydride, perylene-3,4-9,10-tetracarboxylic dianhydride, bis(3,4-dicarboxyphenyl)ether dianhydride, ethylene tetracarboxylic dianhydride, cyclopentadienyl tetracarboxylic dianhydride, benzophenone-3,4,3',4'-tetracarboxylic dianhydride, 2,5-bis(3',4'-dicarboxyphenyl)-oxadiazole-1,3,4 dianhydride, bis(3',4'-dicarboxyphenyloxadiazole-1,3,4)paraphenylene dianhydride, 2-(3',4'-dicarboxyphenyl)-5,6-dicarboxybenzimidazole dianhydride, 2-(3',4'-dicarboxyphenyl)-5,6-dicarboxybenzoxazole dianhydride, 2-(3',4'-dicarboxyphenyl)-5,6-dicarboxybenzthiazole dianhydride and so on.

In addition to use the acid anhydride for preparing coprepolymers of polyisocyanates and acid anhydrides, the acid anhydride may be used as a catalyst for curing the curable resin composition or as one of components constituting the cured resin.

The amount of the acid anhydride employed is less than 0.5 mol per 1 mol of the combined amount of isocyanate group and cyanate group.

The ratio of component (a) and component (b) is not critical. The ratio by weight of component (a) to component (b) may be in the range of from 99:1 to 1:99, preferably from 95:5 to 5:95.

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

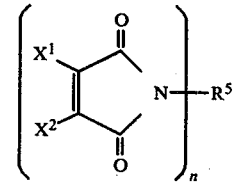

wherein $R^5$ represents divalent to pentavalent aromatic or alicyclic organic group, each of $X^1$ and $X^2$ represents a hydrogen atom, halogen atom or alkyl group, and n represents integer of 2-5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above mentioned components (a) and (b) or components (a), (b) and (c) or by using the product of preliminary reaction of these components.

The curable composition of this invention comprises a mixture and/or a preliminary reaction product of (a) at least one cyanate compound selected from the group consisting of polyfunctional cyanate esters, prepolymers of the cyanates esters, coprepolymers of the cyanate esters and an amine and mixtures thereof and (b) polyisocyanates, prepolymers of the polyisocyanate, or coprepolymers of the polyisocyanate and an acid anhydride and optionally (c) at least one maleimide compound selected from the group consisting of polyfunctional maleimides, prepolymers of the maleimides, coprepolymers of the maleimides and an amines and mixtures thereof (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof.

Other components (d) include polyimide resins; epoxy resins; (meth)acrylates, such as methacrylates, acrylates, acrylic alkenyl esters, methacrylic alkenyl esters, methacrylic epoxy esters, acrylic epoxy esters, its prepolymers, polyallyl compounds, such as diallyl phthalate, divinylbenzene, diallylbenzene, trialkenyl isocyanulates or its prepolymers, phenol resins; polyvinyl acetal resins, such as polyvinyl formal, polyvinyl acetal, or polyvinyl butyral; acrylic resins, silicone resins, or alkyd resins having OH group or COOH group; and liquid or elastic rubbers, such as polybutadiene, butadieneacrylonitrile copolymer, polychloroprene, butadiene-styrene copolymer, polyisoprene or natural rubbers.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylmorpholine, triethanolamine, triethylenediamine; N,N,N',N'-tetramethylbutanediamine, N-methylpiperidine; phenols, such as phenol, cresol, xylenol, resorcine, and phloroglucin; organic metal salts, such as lead naphthanate, lead stearate, zinc naphthenate, zinc octoate, tin oleate, dibutyl tin maleate, manganese naphthanate, cobalt naphthenate, and acetyl aceton iron; and inorganic metal salts, such as stannic chloride, zinc chloride and aluminum chloride, peroxides, such as benzoyl peroxide, lauroyl peroxide, octanoly peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride; hexahydropyromellitic anhydride and hexahydrotrimellic anhydride, azo compounds, such as azoisobutylonitrile, 2,2'-azobispropane, m,m'-azoxystyrene, hydrozones, and mixtures thereof.

In addition to the above mentioned catalysts, a curing agent for epoxy resin and a curing catalyst for epoxy resin may be used as a catalyst of this invention.

The amount of the catalyst employed may be less than 5% by weight of total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide reange of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on the proportions of components constituting the composition and the nature of the components employed. In general, the composition of this invention may be cured by heating it at a temperature within the range of 100°–300° C.

When the curable composition of this invention is used for preparing molding, laminate, adhesive-assembly, press means is preferably applied to the molding, laminate or adhesive-assembly in the heat curing step. In general, these products may be pressed at a superpressure of 1–500 $Kg/cm^2$.

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in mechanical properties, chemical resistance, moisture resistance and the like. The composition of this invention has a variety of uses: as a coating material for rust prevention, flame resistance, flame retardance and the like; as electrical insulating varnish; as adhesive; in laminates to be used for furniture, building materials, sheathing materials, electrical insulating materials, and the like; and in a variety of moldings.

The present invention is further illustrated by the following non-limiting Examples and Comparative Examples. Percent and parts are by weight, unless otherwise specified.

EXAMPLE 1

Bis(4-isocyanatophenyl)ether (450 g) and tria(4-isocyanatophenyl) methane (50 g) mixed and the mixture was stirred so as to obtain uniform mixture. The two compounds were preliminarily reacted at 150° C. for 30 minutes. To the resulting preliminary reaction product was added prepolymer obtained by preliminarily reacting 2,2-bis(4-cyanatophenyl)propane (240 g) at 150° C. for 420 minutes. The mixture was dissolved in mixture of methyl ethyl ketone and N,N-dimethylformamide. Zinc octoate (0.2 g), N-methyl morpholine (0.1 g) and pyromellitic anhydride (10 g) as a catalyst were added to the mixture. The mixture was uniformly stirred. Glass cloth was impregnated with the resulting mixture and was dried with heat to obtain B-staged prepreg.

Five prepreg sheets were stacked and sandwiched between two sheets of copper foil with 35μ thickness. The laminate was laminate-molded at 40 Kg/cm² at 175° C. for 110 minutes and further at 55 Kg/cm² at 220° C. for 180 minutes to obtain copper-clad laminate. The physical properties of the copper-clad laminate are shown in Table 1.

CONTROL 1

The procedure of Example 1 was repeated except 2,2-bis(4-cyanatophenyl)propane was not used. The physical properties of the resulting laminate are shown in Table 1.

TABLE 1

| | Ex. 1 | Control 1 |
|---|---|---|
| peel strength of copper foil with 35μ thickness (Kg/cm) | 1.80 | 1.55 |
| hot solder resistance at 320° C. (sec.)*¹ | 150< | blister developed in 63 seconds |
| water absorption rate (%)*² | 0.29 | 0.54 |

*¹When a 25 mm × 25 mm test sample is floated on melted solder of 320° C., whether or not copper foil was peeled from the sample.
*²Water absorption rate was measured on the based on JIS K 6911.

EXAMPLE 2

To a mixture of 4,4'-diisocyanatophenylmethane (400 g) and 4,4',4''-triisocyanatophenyl ether (20 g) were added bisphenol A type epoxy resin (Epicoat 1001 produced by Shell Oil Co.) (250 g) and preliminary reaction product obtained by reacting 2,2-bis(4-cyanatophenyl)ether (900 g) and bis(4-maleimidephenyl)ether (100 g) at 160° C. for 35 minutes. The mixture was uniformly stirred. To the mixture were added pyromellitic anhydride (190 g), zinc octoate (0.2 g), glass fiber chops (15 g), calcium carbonate (1500 g) and carbon black (4 g). The mixture was uniformly milled by roll and was ground to obtain material for molding. Molded product was obtained by molding the material at 70 Kg/cm² at 180° C. for 190 minutes. The physical properties of the molded product are shown in Table 2.

CONTROL 2

Prepolymer was prepared by preliminarily polymerizing 2,2-bis(4-cyanatophenyl)ether (1800 g) at 150° C. for 450 minutes. To the prepolymer were added zinc octoate (0.6 g), glass fiber chops (13 g), calcium carbonate (1,450 g) and carbon black (4 g). The mixture was uniformly milled by roll. The molded product was obtained in the same way as in Example 2. The physical properties of the product are shown in Table 2.

TABLE 2

| | | Ex. 2 | Control 2 |
|---|---|---|---|
| flexural strength | 25° C. | 10 | 9 |
| (Kg/mm²) | 250° C. | 8 | 6 |
| heat distortion temperature (°C.) | | 285 | 249 |
| hardness (Rochwell M) | | 103 | 95 |
| pressure cooker resistance (120° C., 2 atm in steam 24 hrs.) | | no change | changed slightly |

What is claimed is:
1. A curable resin composition comprising:
   (a) at least one cyanate ester compound selected from the group consisting of:
   (1) a polyfunctional aromatic cyanate ester monomer having the formula:

wherein m is 2 to 5 and R is an aromatic organic group, the cyanate groups being bonded to an aromatic ring of said aromatic organic group,
   (2) a homoprepolymer of one or more polyfunctional cyanate esters of (1), and
   (3) a coprepolymer of (1) and an amine; and
   (b) at least one compound selected from the group consisting of:
   (1) a polyisocyanate,
   (2) a homoprepolymer of one or more polyisocyanates, and
   (3) a coprepolymer of (1) and an acid anhydride, said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene, 1,3-, 1,4-, 1,6-, 1,8-, 2,6- or 2,7-dicyanatonaphthalene; 1,3,6-tricyanatonaphthalene; 4,4'-dicyanatobiphenyl; bis(4-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl) sulfone; tris(4-cyanatophenyl)phosphite; tris(4-cyanatophenyl) phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein the polyisocyanate is selected from the group consisting of 2,2-bis-(p-isocyanatephenyl)propane; bis(p-isocyanatophenyl)methane; 4,4'-diisocyanatobiphenyl; 4,4'-diisocyanatodiphenyl sulfone; 4,4'-diisocyanatodiphenyl ether; 1,1-di(p-isocyanatophenyl) cyclohexane; methyl-bis(m-isocyanatophenyl)phosphineoxide; 1,5-diisocyanatonaphthalene; m-phenylenediisocyanate; tolylenediisocyanate; 3,3'-dimethyl-4,4'-diisocyanatobiphenyl; 3,3'-dimethoxy-4,4'-diisocyanatobiphenyl; m-xylylenediisocyanate; p-xylylenediisocyanate; bis(4-isocyanatohexyl)methane; hexamethylenediisocyanate; dodecamethylenediisocyanate; 2,11-diisocyanato dodecane; bis(p-phenyleneisocyanate-oxadiazole-1,3,4)p-phenylene; bis(p-phenyleneisocyanate)oxadiazole-1,3,4; bis(m-phenyleneisocyanate)oxadiazole-1,3,4; bis(4-p-phenyleneisocyanate-thiazol-2-yl)m-pheneylen; bis(m-phenyleneisocyanate) 4-phenyltriazole-1,2,4; (2-phenylene)benzimidazole-5,4'-diisocyanate; (2-phenylene)benzoxazole-5,4'-diisocyanate; (2-phenylene)benzothiazole-6,4'-diisocyanate; bis(2-phenyleneisocyanate-benzimidazole-6-yl)2,5-oxadiazole-1,3,4; bis(p-phenyleneisocyanate-2-benzimidazol-6-yl); bis(p-phenyleneisocyanate-2-benzoxazole-6-yl); tris(p-isocyanatophenyl)methane; namely 4,4',4"-triisocyanatotriphenyl methane; 2,4',4"-triisocyanatodiphenyl ether; 4,4',4"-triisocyanatotriphenyl phosphate; namely tri(p-isocyanatophenyl)phosphate; 2,4,6-triisocyanato-1-methylbenzene; 2,4,6-triisocyanato-1,3,5-trimethylbenzene; 1,3,7-triisocyanatonaphthalene; 2,4,4'-triisocyanatodiphenyl; 2,4,4'-triisocyanato-3-methyldiphenylmethane; 2,2',5,5'-tetraisocyanato-4,4'-dimethyldiphenylmethane; polyisocyanato polyphenylene polymethylene; and polyisocyanato polyoxyphenylene.

4. The composition as defined in claim 1 wherein the acid anhydride is represented by the formula

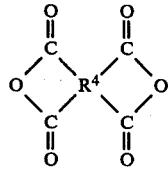

wherein $R^4$ is organic group having 2 or more carbon atoms and valency of 4 or more and having no active hydrogen, and $R^4$ has such a structure that the two lactone 1-oxide rings have 4 to 6 members.

5. The composition as defined in claim 1 wherein the ratio by weight of component (a) to component (b) is in the range of from 99:1 to 1:99.

6. The composition as defined in claim 4 wherein amount of the acid anhydride employed is less than 0.5 mol per 1 mol of the combined amount of isocyanate group and cyanate group.

7. A curable resin composition comprising:
(a) at least one cyanate ester compound selected from the group consisting of:
(1) a polyfunctional aromatic cyanate ester monomer having the formula:

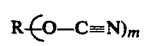

wherein m is 2 to 5 and R is an aromatic organic group, the cyanate groups being bonded to an aromatic ring of said aromatic organic group,
(2) a homoprepolymer of one or more polyfunctional cyanate esters of (1), and
(3) a coprepolymer of (1) and an amine;
(b) at least one compound selected from the group consisting of:
(1) a polyisocyanate,
(2) a homoprepolymer of one or more polyisocyanates, and
(3) a coprepolymer of (1) and an acid anhydride,
(c) at least one compound selected from the group consisting of:
(1) a polyfunctional maleimide,
(2) a homoprepolymer of one or more polyfunctional maleimides, and
(3) a coprepolymer of (1) and an amine, said composition including a mixture of components (a), (b) and (c), a preliminary reaction product of components (a), (b) and (c), the combination of said mixture and said preliminary reaction product of (b) and (c), the combination of (b) and the preliminary reaction product of (a) and (c), or the combination of (c) and the preliminary reaction product of (a) and (b).

8. The composition as defined in claim 7 wherein the cyanate ester is selected from the group consisting of 1,3- 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ehter; bis(4-cyanatophenyl)thioether; bis(4-cyanatophenyl) sulfone; tris(4-cyanatophenyl)phosphite; tris(4-cyanatophenyl) phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

9. The composition as defined in claim 7 wherein the polyisocyanate is selected from the group consisting of 2,2-bis(p-isocyanatophenyl)propane; bis(p-isocyanatophenyl)methane; 4,4'-diisocyanatobiphenyl; 4,4'-diisocyanatodiphenyl sulfone; 4,4'-diisocyanatodiphenyl ether; 1,1-di(p-isocyanatophenyl) cyclohexane; methyl-bis(m-isocyanatophenyl)phosphineoxide; 1,5-diisocyanatonaphthalene; m-phenylenediisocyanate; tolylenediisocyanate; 3,3'-dimethyl-4,4'-diisocyanatobiphenyl; 3,3'-dimethoxy-4,4'-diisocyanatobiphenyl; m-xylylenediisocyanate; p-xylylenediisocyanate; bis(4-isocyanatohexyl)methane; hexamethylenediisocyanate; dodecamethylenediisocyanate; 2,11-diisocyanato dodecane; bis(p-phenyleneisocyanate-oxadiazole-1,3,4)p-phenylene; bis(p-phenyleneisocyanate)oxadiazole-1,3,4; bis(m-phenyleneisocyanate) oxadiazole-1,3,4; bis(4-p-phenyleneisocyanate-thiazole-2-yl)m-phenylene; bis(m-phenyleneisocyanate) 4-phenyltriazole-1,2,4; (2-phenylene)benzimidazole-5,4'-diisocyanate; (2-phenylene)benzoxazole-5,4'-diisocyanate; (2-phenylene)benzothiazole-6,4'-diisocyanate; bis(2-phenyleneisocyanate-benzimidazol-6-yl)2,5-oxadiazole-1,3,4; bis(p-phenyleneisocyanate-2-benzimidazole-6-yl); bis(p-pehnyleneisocyanate-2-benzoxazol-6-yl); tris(p-isocyanatophenyl)methane; namely 4,4',4"- triisocyanatotriphenyl methane; 2,4',4''-triisocyanatodiphenyl ether; 4,4',4''-triisocyanatotriphenyl phosphate; namely tri(p-isocyanatophenyl)phosphate; 2,4,6-triisocyanato-1-methylbenzene; 2,4,6-triisocyanato-1,3,5-trimethylbenzene; 1,3,7-triisocyanatonaphthalene; 2,4,4'-triisocyanatodiphenyl; 2,4,4'-triisocyanato-3-methyldiphenylmethane; 2,2',5,5'-tetraisocyanato-4,4'-dimethyldiphenylmethane; polyisocyanato polyphenylene polymethylene; polyisocyanato polyoxyphenylene.

10. The composition as defined in claim 7 wherein the acid anhydride is represented by the formula

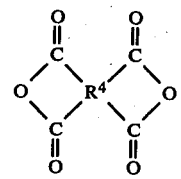

wherein $R^4$ is organic group having 2 or more carbon atoms and valency of 4 or more and having no active hydrogen and $R^4$ has such a structure that the two lactone 1-oxide rings have 4 to 6 members.

11. The composition as defined in claim 10 wherein amount of the acid anhydride employed is less than 0.5 mol per 1 mol of the combined amount of isocyanate group and cyanate group.

* * * * *